United States Patent [19]

Garg et al.

[11] Patent Number: 4,931,942
[45] Date of Patent: Jun. 5, 1990

[54] TRANSITION CONTROL SYSTEM FOR SPACECRAFT ATTITUDE CONTROL

[75] Inventors: Subhash C. Garg, San Jose, Calif.; Bruce D. Gretz, Philadelphia, Pa.

[73] Assignee: Ford Aerospace Corporation, Newport Beach, Calif.

[21] Appl. No.: 198,942

[22] Filed: May 26, 1988

[51] Int. Cl.$^5$ ............................................. B64G 1/38
[52] U.S. Cl. .................................. 364/459; 244/164; 244/170
[58] Field of Search ............................. 364/434, 459; 244/164–166, 169–172; 318/582

[56] References Cited

U.S. PATENT DOCUMENTS

| | | | |
|---|---|---|---|
| 3,643,897 | 2/1972 | Johnson, Jr. | 244/3.22 |
| 3,866,025 | 2/1975 | Cavanagh | 364/434 |
| 3,937,423 | 2/1976 | Johansen | 244/169 |
| 3,944,172 | 3/1976 | Becker | 364/434 |
| 3,984,071 | 10/1976 | Fleming | 364/434 |
| 3,997,137 | 12/1976 | Phillips | 244/169 |
| 3,998,409 | 12/1976 | Pistiner | 364/434 |
| 3,999,729 | 12/1976 | Muhlfelder et al. | 364/434 |
| 4,023,752 | 5/1977 | Pistiner et al. | 244/169 |
| 4,071,211 | 1/1978 | Muhlfelder et al. | 244/171 |
| 4,174,819 | 11/1979 | Bruderle et al. | 244/170 |
| 4,294,420 | 10/1981 | Broquet | 244/171 |
| 4,370,716 | 1/1983 | Amieux | 364/434 |
| 4,386,750 | 6/1983 | Hoffman | 244/170 |
| 4,521,855 | 6/1985 | Lehner et al. | 364/459 |
| 4,591,118 | 5/1986 | Chan | 244/171 |
| 4,599,697 | 7/1986 | Chan et al. | 244/169 |
| 4,725,024 | 2/1988 | Vorlicek | 244/165 |
| 4,767,084 | 8/1988 | Chan et al. | 244/171 |

Primary Examiner—Gary Chin
Attorney, Agent, or Firm—Edward J. Radlo; Kenneth R. Allen; Keith L. Zerschling

[57] ABSTRACT

A method for controlling transition from thruster control to momentum wheel control to minimize nutation angle and transition time in a three-axis stabilized spacecraft employing an internal body fixed-momentum wheel as an attitude stabilizer. The method employs direct, substantially real-time measurement of momentum components and angular rates and generates paired roll thrust impluses and paired yaw thrust impulses in synchronization with the nutation period of the spacecraft to drive the spacecraft to a state of substantially zero nutation. The controller employs a deadbeat principle in a closed-loop real-time feedback system. In a preferred embodiment, the impulsive thruster firing commands in roll and yaw are simultaneous, spaced one-half nutation period apart in time with the effect that the target momentum is achieved in one to three pairs of impulse firings. The invention provides, with minimum transient overshoot, automatic reduction of angular momentum relative to a desired on-orbit state to a level which can be managed by a low-authority momentum wheel controller.

11 Claims, 2 Drawing Sheets

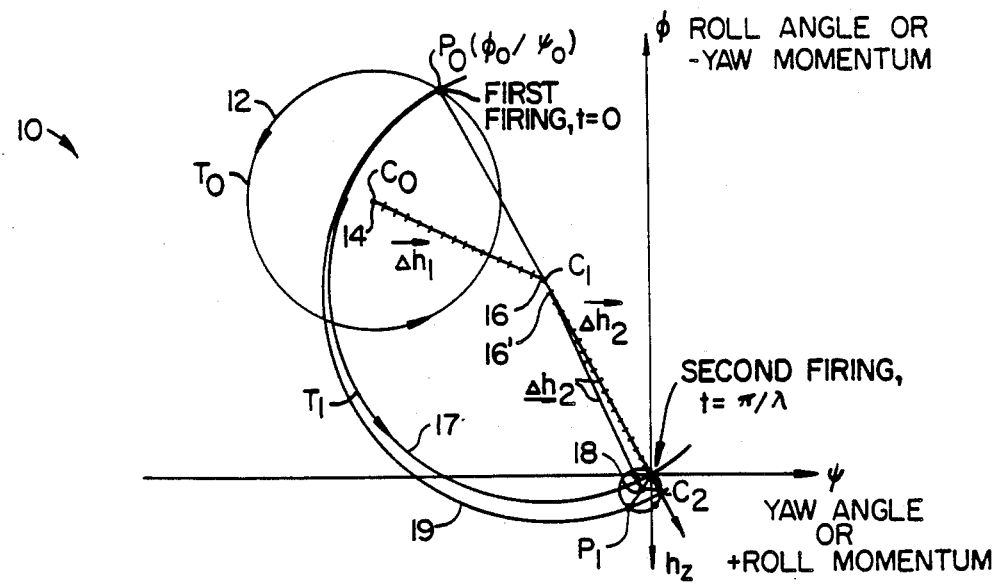
FIG._1.

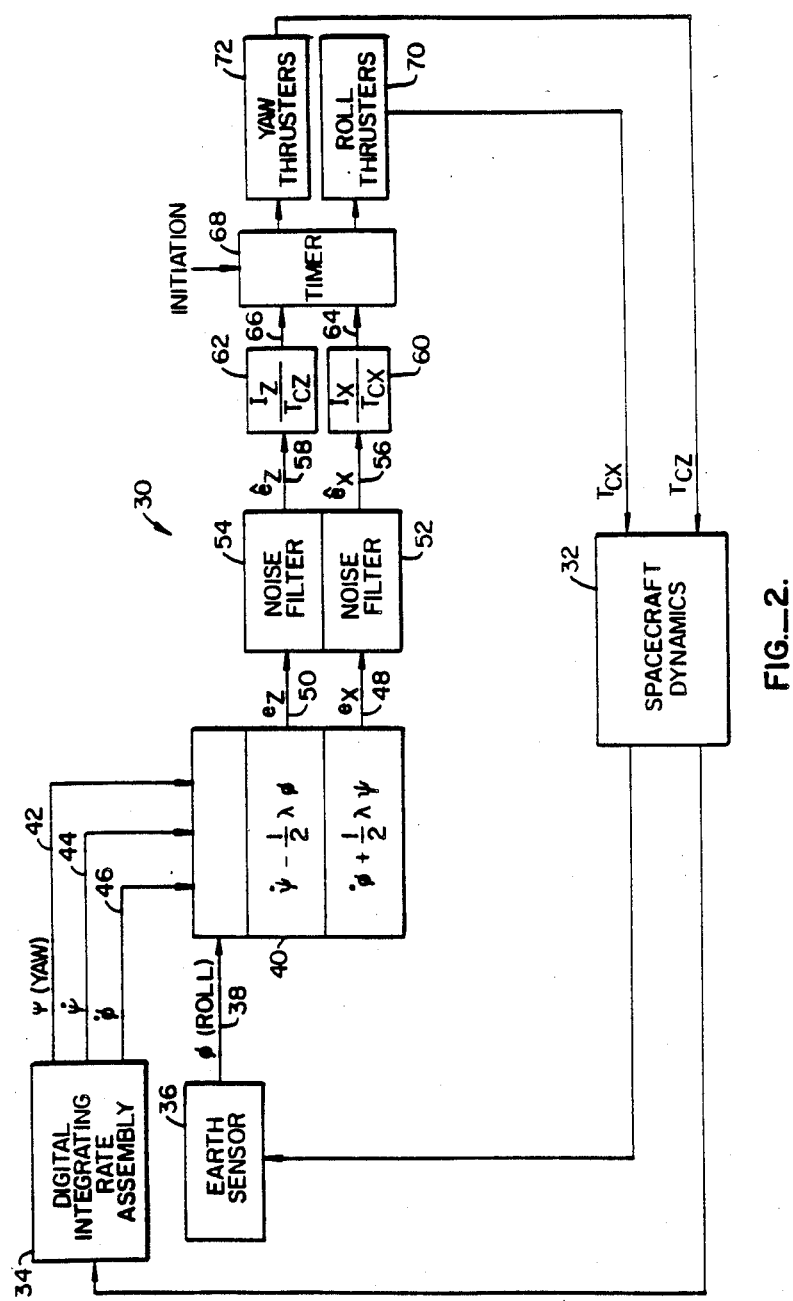
FIG._2.

TRANSITION CONTROL SYSTEM FOR SPACECRAFT ATTITUDE CONTROL

BACKGROUND OF THE INVENTION

1. Field of the Invention

This invention relates to attitude control systems for three-axis stabilized spacecraft. More specifically, the invention relates to controlling transition from thruster control to momentum wheel control in a momentum-bias three-axis stabilized geosynchronous spacecraft.

One of the tasks in a spacecraft having a momentum-bias attitude control system is control of the transition from a high-authority control mode, such as that used for stationkeeping maneuvers, with its relatively high angular rates, to a low-authority control mode, which relies on a momentum-bias attitude control system using for example a momentum wheel. The transition from the station-keeping mode to on-orbit mode must be performed carefully to avoid saturation and possibly loss of attitude control in the low-authority-on-orbit control mode, since the high angular authority on-orbit rates prior to transition can cause large nutation.

The desired control accuracy of a three-axis stabilized spacecraft is 0.01 degrees to 0.05 degrees, exclusive of pointing error due to misalignments and structural or thermal distortion. However, the typical uncorrected attitude error following a stationkeeping maneuver is a nutation circle with a radius on the order of twenty-five times greater, i.e., 0.25 degrees to 1.25 degrees. To achieve a stable on-orbit mode, nutation amplitude must be sharply reduced, and preferably reduced to zero, before control is passed to the momentum-wheel-based on-orbit controller.

2. Description of the Prior Art

Most nutation correction systems are open-loop control systems based on calculation, rather than measurement, of critical parameters. Respecting nutation control systems, the following patents were uncovered in a search of the public records of the U.S. Patent and Trademark Office.

U.S. Pat. No. 3,866,025 (Cavanaugh) discloses a spacecraft attitude control system for producing thruster firings which align the total angular momentum vector with the desired orbit normal vector while simultaneously adjusting orbit. The invention employs a commonly-available sensor and thruster system. However, it seeks to perform an orbit adjustment maneuver in a manner that is intended to minimize build-up of nutation during the maneuver, rather than provide a mechanism for correction following the maneuver. The control system computes angular rates rather than directly sensing the rates. In addition, the patent is silent about the specific transition attitude control techniques of the present invention.

Other patents uncovered which contain additional information on the general topics of nutation attenuation, correction in spacecraft systems and the like are as follows:

| U.S. Pat. No. | Inventor |
|---|---|
| 3,643,897 | Johnson, Jr. |
| 3,937,423 | Johansen |
| 3,944,172 | Becker |
| 3,984,071 | Fleming |
| 3,997,137 | Phillips |
| 4,023,752 | Pistiner et al. |
| 4,174,819 | Bruederle et al. |
| 4,370,716 | Amieux |
| 4,386,750 | Hoffman |
| 4,521,855 | Lehner et al. |

The Johnson, Jr. patent pertains to a spin-stabilized spacecraft, rather than a three-axis stabilized spacecraft as described herein. It attempts to keep the nutation angle bounded, but it fails to suggest how to reduce nutation to zero.

The Johansen patent describes an attitude control system for a three-axis stabilized spacecraft. It lacks any mechanism for sensing yaw angle, yaw angular rate, and roll angular rate.

The Becker patent concerns spacecraft without internal momentum wheel control and therefore is not affected by nutation.

The Fleming patent concerns the damping of a nutation circle by means of two thruster firings which are based on sensing the spacecraft roll angle only. There are no means for sensing roll, yaw, and yaw angular rates. As a consequence there can be no assurance of stability.

The Phillips patent, the Pistener patent and the Amieux patent relate to spin-stabilized spacecraft, not three-axis stabilized spaceccraft and are not relevant to the invention.

The Bruederle et al. patent pertains to attitude control of a three-axis stabilized spacecraft, but does not address the issues of nutation control and transition from the thruster control mode to the wheel control mode. There are no sensors for yaw angle or yaw angular rates.

SUMMARY OF THE INVENTION

According to the invention, a method is provided for controlling transition from thruster control to momentum-wheel control to minimize nutation angle and transition time in a three-axis stabilized spacecraft employing an internal body fixed-momentum wheel as an attitude stabilizer. The method employs direct, substantially real-time measurement of momentum components and angular rates and generates paired thrust impulses in synchronization with the nutation period of the spacecraft. In an ideal case, absent measurement errors or thruster impulse errors, the nutation is driven to zero in one-half nutation period. However, since errors are always present, the controller employs a deadbeat principle in a closed-loop real-time feedback system. In a preferred embodiment, the impulsive thruster firing commands in roll and yaw are simultaneous, spaced one-half nutation period apart in time with the effect that the spacecraft transverse momentum is reduced to an acceptably low level in three or fewer successive pairs of thruster impulse firings.

The invention provides, with minimum transient overshoot, automatic reduction of angular momentum relative to a desired on-orbit state to a level which can be managed by a low-authority momentum wheel controller.

The invention will be better understood upon reference to the following detailed description in connection with the following drawings. The description herein is based on a symmetrical spacecraft, i.e., having equal yaw and roll inertias, for simplicity of explanation.

However, the principles of the invention apply to any spacecraft.

BRIEF DESCRIPTION OF THE DRAWINGS

FIG. 1 is a vector diagram illustrating reduction of transverse momentum by deadbeat impulse firing control of a three-axis stabilized spacecraft wherein nutation circles, representing either circles or ellipses are shown for simplicity.

FIG. 2 is a schematic diagram of a momentum control system for a spacecraft in accordance with the invention.

DESCRIPTION OF SPECIFIC EMBODIMENTS

FIG. 1 is a vector diagram 10 of a spacecraft which illustrates nutation circles or in general ellipses relative to a set of transverse (roll/yaw) momentum axis. For simplicity, the body and structure of the spacecraft itself are not shown in the figures. One of the purposes of the invention is to minimize nutation and ideally reduce nutation of a spacecraft to zero. FIG. 1 illustrates the effects of appropriate angular impulse correction in accordance with the invention.

A few elementary principles will help in the understanding of the invention. First, the change in momentum, a vector, $\Delta H$ of the spacecraft is equal to the product of the torque, a vector, T and the firing time t of the thrusters. The vector $\Delta H$ can be reduced to its roll component in x and its yaw component in z so that the vector equation:

$$\Delta H = T \Delta t$$

is readily expanded to:

$$\Delta H_x = T_x \Delta t;$$

$$\Delta H_y = T_y \Delta t; \text{ and}$$

$$\Delta H_z = T_z t$$

where $\Delta t$ is the firing time. Since no pitch firings are involved, the y component is zero and therefore pitch can be ignored for the purposes of the invention. The firing time is on the order of 40 ms to 50 ms, whereas the nutation period $2\pi/\lambda$, i.e., the time for a body to nutate through an entire nutation circle, is on the order of 150-300 seconds or longer. The long nutation period justifies any approximations related to impulsive firing. The nutation period is a function of the inertia of the spacecraft $I_{sc}$ and the wheel momentum of the spacecraft momentum wheel $H_w$. Thruster firing causes a change of center of the nutation circle, with the roll angle $\phi$ being proportional to the yaw momentum $H_z$ or $\phi_c = -\Delta H_z/H_w x$, and the yaw angle $\psi$ being proportional to the roll momentum $H_x$, or $\Delta \psi_c = \Delta H_x/H$. Only roll and yaw need to be considered because pitch control is independent of roll and yaw.

The diagram 10 showing a roll angle axis and a yaw angle axis presents the plane of the nutation circle. More specifically, one of the objects is to reduce nutation and the corresponding nutation circle 12 with its center 14 at $C_0$ to zero. According to the invention, this requires measuring four independent variables, roll angle, roll rate, yaw angle and yaw rate, and then using these measured quantities to cause thrusters to generate impulse thrust to move the center of nutation 14 by a momentum vector ($\Delta h_1 = \Delta h_x + \Delta h_z$) to a new center 16 at $C_1$ which is closer to the origin and thereafter iteratively to move the center of nutation ideally to the origin. In reality there will be a center of nutation 16', of nutation circle 19 which results in a nutation circle 19 with a center 18 actually at $C_2$ near the origin in response to the actual change in momentum vector $\Delta h_2$. A third impulse $\Delta h_3$ or successive impulses may be applied. These momentum changes are accomplished according to the invention by providing for simultaneous impulse firings of roll and yaw thrusters of the spacecraft. The time of firing is spaced at one-half a nutation period, that is, at $t=0$ and $t=\pi/\lambda$, where $2\pi/\lambda$ is the nutation period. The nutation period in a typical spacecraft is on the order of 300 seconds. Ideally, that is, in the absence of errors, the second thruster firing at $t=\pi/\lambda$ occurs at the origin such that the nutation center is at the origin, and nutation is reduced to zero. In practice, up to three firings have been found to be necessary to reduce nutation to zero.

FIG. 2 illustrates schematically a control system 30 in accordance with the invention. The spacecraft is represented figuratively by spacecraft dynamics 32. Spacecraft dynamics 32 produce as output parameters the motions of the spacecraft, the direction and sense of which are measured by a digital integrating rate assembly (DIRA) 34, which is a spacecraft-based gyroscope, and by an earth sensor 36.

A roll signal $\phi$ is provided via on roll signal line 38 to an onboard error calculator 40 from the earth sensor 36. In addition the DIRA provides as output a yaw signal $\psi$ on yaw signal line 42, a yaw rate signal on yaw rate signal line 44 and a roll rate signal $\dot\phi$ on roll rate signal line 46 to the onboard error calculator 40.

The onboard error calculator 40 computes from these measured parameters, as hereinafter explained, the preliminary values for roll error $e_x$ and the preliminary values for yaw error $e_z$ and provides these signals via signal lines 48 and 50, or their equivalent, to noise filter means 52 and 54. The noise filter means 52 and 54 are basically low-pass filters whose function is to filter out high frequency rate noise from the roll and yaw error signals due to measurement errors and structural flexibility effects in the spacecraft. The output signal of the first noise filter 52 is the roll error signal $\hat{e}_x$ on signal line 56, and the output signal of the second noise filter 54 is the roll error signal $\hat{e}_z$ on signal line 58. Thereafter, the two error signals are weighted by values which for these purposes are constant, namely, the roll inertia component $I_x$ divided by the transverse roll torque component $T_{cx}$ 60, and the yaw inertia component $I_z$ divided by the transverse yaw torque component $T_{cz}$ 62. The output signals 64, 66 are applied to a timer 68 which uses them to control the impulse period for the respective roll thrusters 70 and yaw thrusters 72. The thrusters 70 and 72 apply torques $T_{cx}$ (roll torque) and $T_{cz}$ (yaw torque) to the spacecraft, which in turn is reflected in modified spacecraft dynamics 32. Thruster firing causes a change in the center of nutation.

In accordance with the invention, the applied torques reduce the transverse momentum toward zero and the nutation center toward zero yaw and roll in paired, or deadbeat, thruster firings whose duration and vector are determined by the measured roll, yaw, roll rate, and yaw rate. The error signals for roll error and yaw error are calculated from the measured quantities according to the following equations of motion:

$$e_z = -(\psi + \tfrac{1}{2}\lambda\phi), \text{ and}$$

$$e_x = -(\phi - \tfrac{1}{2}\lambda\psi).$$

These equations, properly filtered and weighted by constants, provide sufficient information for all of the error correction necessary to effect a nutation circle which ideally passes through the origin after one-half nutation apart. Given that the first thruster firing is computed as above, the roll and yaw angles will be close to zero ($P_1$ in FIG. 1) after one-half nutation period. A second set of thruster firing at this time, again computed from the sensor data according to the above equations, will result in a much smaller nutation circle. This process can be repeated, with one or more additional firings, as necessary. In practice, it has been found that one additional set of roll/yaw thruster firings, after an additional one-half nutation period, is highly beneficial.

Pitch is not a factor in nutation correction, since pitch control is independent of roll and yaw. Thus, with instantaneous knowledge of roll, yaw, roll rate and yaw rate and knowledge of the spacecraft moments of inertia, it is feasible to calculate the momentum of the spacecraft in two dimensions and to correct that momentum.

The invention has now been explained with reference to specific embodiments. Other embodiments will be apparent to those of ordinary skill in the art in light of this disclosure. For example, the nutation frequency can be based on measurement of pitch wheel speed, or it may be closely approximated by a constant. Similarly, different roll and yaw moments of inertia, and products of inertia if significant, can be accounted for in calculating the transverse momentum components. A third variation may result if the control thrusters have significant cross-coupling torques, as this will affect the calculation of thruster firing times. Depending upon the complexity of the calculations required, a digital processor may be preferable to analog electronics. Therefore, it is not intended that this invention be limited, except as indicated by the appended claims.

I claim:

1. In a three-axis stabilized spacecraft employing an internal body-fixed momentum wheel as an attitude stabilization means and characterized by a nutation period and a corresponding nutation frequency, a method for controlling transition from thruster control to momentum wheel control to minimize nutation angle and transition time, said method comprising the steps of:
   (a) obtaining values representative of spacecraft roll angle, spacecraft yaw angle, spacecraft roll rate and spacecraft yaw rate;
   (b) calculating a spacecraft transverse angular momentum vector from spacecraft moments of inertia and said values representative of spacecraft roll angle, spacecraft yaw angle, spacecraft roll rate and spacecraft yaw rate, said transverse angular momentum vector comprising a roll component and a yaw component;
   (c) computing from said values representative of spacecraft roll angle, spacecraft yaw angle, spacecraft roll rate and spacecraft yaw rate a firing duration for each one of a set of attitude control thrusters for causing spacecraft motion following thruster firing to reduce nutation amplitude toward a transverse angular momentum of zero;
   (d) firing said set of attitude control thrusters according to said computed firing duration; and
   (e) repeating at least once more said steps (a) through (d) at an interval of substantially one-half of said nutation period of said spacecraft.

2. The method according to claim 1 further including the step of attenuating spurious signals substantially above the nutation frequency of said spacecraft.

3. The method according to claim 1 further including the step of calculating said nutation period from measured rotational speed of said momentum wheel and from moments of inertia of said wheel and of said spacecraft.

4. The method according to claim 1 wherein said repeating step is limited to a preselected number of repetitions.

5. The method according to claim 1 wherein said repeating step is terminated when magnitude of said transverse angular momentum immediately following said firing step is below a preselected value.

6. The method according to claim 2 wherein further including the step of calculating said nutation period from measured rotational speed of said momentum wheel and from moments of inertia of said wheel and of said spacecraft.

7. The method according to claim 2 wherein said repeating step is limited to a preselected number of repetitions.

8. The method according to claim 2 wherein said repeating step is terminated when magnitude of said transverse angular momentum immediately following said firing step is below a preselected value.

9. The method according to claim 2 wherein said thrusters are disposed at orthogonal angles and wherein said firing step includes simultaneous firings to control roll and to control yaw.

10. In a three-axis stabilized spacecraft employing an internal body-fixed momentum wheel as an attitude stabilization means and characterized by a nutation period, an apparatus for controlling transition from thruster control to momentum wheel control to minimize nutation angle and transition time, said apparatus comprising:
   sensor means for obtaining values representative of spacecraft roll angle, spacecraft yaw angle, spacecraft roll rate and spacecraft yaw rate; and
   means coupled to said sensor means for controlling firing of spacecraft roll and yaw attitude control thrusters at intervals of substantially one-half of said nutation period, including
       means for calculating a spacecraft transverse angular momentum vector at intervals of one-half of said nutation period from spacecraft moments of inertia and said values representative of spacecraft roll angle, spacecraft yaw angle, spacecraft roll rate and spacecraft yaw rate, said transverse angular momentum vector comprising a roll component and a yaw component,
       means for computing from said values representative of spacecraft roll angle, spacecraft yaw angle, spacecraft roll rate and spacecraft yaw rate a firing duration for said attitude control thrusters for causing spacecraft motion following thruster firing to reduce nutation amplitude toward a transverse angular momentum of zero,
       means for causing firing of said roll and yaw attitude control thrusters according to said firing duration, and
       timing means for sequencing firing of said roll and yaw attitude control thrusters at intervals of substantially one-half of said nutation period of said spacecraft.

11. The apparatus according to claim 10 further including filter means coupled between said sensor means and said controlling means, said filter means for removing spurious signals substantially above a nutation frequency of said spacecraft.

* * * * *